US 11,413,797 B2

(12) United States Patent
Kittel

(10) Patent No.: US 11,413,797 B2
(45) Date of Patent: Aug. 16, 2022

(54) CONNECTION ELEMENT AND METHOD FOR INTRODUCING A CONNECTION ELEMENT

(71) Applicant: EJOT GmbH & Co. KG, Bad Berleburg (DE)

(72) Inventor: Dieter Kittel, Bad Laasphe (DE)

(73) Assignee: EJOT GmbH & Co. KG, Bad Berleburg (DE)

( * ) Notice: Subject to any disclaimer, the term of this patent is extended or adjusted under 35 U.S.C. 154(b) by 0 days.

(21) Appl. No.: 17/258,620

(22) PCT Filed: Jul. 1, 2019

(86) PCT No.: PCT/EP2019/067514
§ 371 (c)(1),
(2) Date: Jan. 7, 2021

(87) PCT Pub. No.: WO2020/015987
PCT Pub. Date: Jan. 23, 2020

(65) Prior Publication Data
US 2021/0268699 A1     Sep. 2, 2021

(30) Foreign Application Priority Data
Jul. 18, 2018 (DE) ............... 10 2018 117 370.9

(51) Int. Cl.
*F16B 5/01* (2006.01)
*B29C 44/12* (2006.01)
(Continued)

(52) U.S. Cl.
CPC ........ *B29C 44/1228* (2013.01); *B29C 65/069* (2013.01); *B29C 65/0672* (2013.01);
(Continued)

(58) Field of Classification Search
CPC .......... F16B 5/01; F16B 13/02; F16B 37/061; F16B 2001/0078; Y10S 411/903
(Continued)

(56) References Cited

U.S. PATENT DOCUMENTS 4,090,899 A * 5/1978 Reich .................. B29C 66/1222
156/79
4,729,705 A * 3/1988 Higgins ................ F16B 37/122
52/704
(Continued)

FOREIGN PATENT DOCUMENTS

CN       107639844 A     1/2018
DE       2551850 A1     6/1976
(Continued)

OTHER PUBLICATIONS

German Search Report, dated Feb. 14, 2019, pp. 1-12.
(Continued)

*Primary Examiner* — Roberta S Delisle
(74) *Attorney, Agent, or Firm* — George McGuire

(57) ABSTRACT

The invention relates to a connection element, in particular a thermal adhesive bonding boss, to be introduced into at least one component, in particular a hollow chamber component, in particular a plate-shaped hollow chamber component which has hollow chambers, under the effect of pressure and rotation, comprising a main part which comprises a thermoplastic synthetic material. The connection element has a longitudinal axis and is designed to rotate about the longitudinal axis, and the connection element has an upper face with a tool placement point and a lower face which faces away from the upper face, wherein the connection element has an expanding portion made of a thermally
(Continued)

activatable expandable material on the main part on a circumferential surface extending between the upper face and the lower face.

9 Claims, 6 Drawing Sheets

(51) Int. Cl.
| | |
|---|---|
| *B29C 65/06* | (2006.01) |
| *B29C 65/00* | (2006.01) |
| *F16B 13/02* | (2006.01) |
| *F16B 37/06* | (2006.01) |
| *B29K 105/04* | (2006.01) |
| *F16B 1/00* | (2006.01) |

(52) U.S. Cl.
CPC ............ *B29C 66/474* (2013.01); *B29C 66/71* (2013.01); *B29C 66/72525* (2013.01); *B29C 66/7392* (2013.01); *F16B 5/01* (2013.01); *F16B 13/02* (2013.01); *F16B 37/061* (2013.01); *B29K 2105/048* (2013.01); *F16B 2001/0078* (2013.01); *Y10S 411/903* (2013.01)

(58) Field of Classification Search
USPC .................. 411/82, 82.2, 108, 183, 907, 909
See application file for complete search history.

(56) References Cited

U.S. PATENT DOCUMENTS

| | | | | |
|---|---|---|---|---|
| 4,934,857 A * | 6/1990 | Swanson | ................... | F16B 5/02 403/30 |
| 5,093,957 A * | 3/1992 | Do | ........................ | E04C 2/365 52/793.1 |
| 5,437,750 A | 8/1995 | Rinse et al. | | |
| 5,632,582 A * | 5/1997 | Gauron | ..................... | F16B 5/01 411/258 |
| 5,879,115 A * | 3/1999 | Medal | ................... | B29C 65/562 156/423 |
| 6,153,035 A | 11/2000 | Van Laeken | | |
| 6,193,456 B1 * | 2/2001 | Stumpf | ................. | F16B 37/122 411/456 |
| 6,497,082 B1 | 12/2002 | Toyoda et al. | | |
| 8,007,216 B2 * | 8/2011 | Ross | ..................... | F16B 37/122 411/82 |
| 8,556,560 B2 * | 10/2013 | Billion Laroute | .... | F16B 37/122 411/181 |
| 2006/0291974 A1 * | 12/2006 | McGee | ............... | B25B 27/0014 411/171 |
| 2007/0003363 A1 * | 1/2007 | Tseng | ..................... | F16B 13/02 403/238 |
| 2017/0036750 A1 | 2/2017 | Lewis et al. | | |

FOREIGN PATENT DOCUMENTS

| | | |
|---|---|---|
| DE | 102014204449 A1 | 9/2015 |
| DE | 102015208671 A1 | 11/2016 |
| DE | 102015210963 A1 | 12/2016 |
| DE | 102016007698 A1 | 12/2017 |
| EP | 3330549 A1 | 6/2018 |
| FR | 3054273 A1 | 1/2018 |
| WO | 9312344 A1 | 6/1993 |
| WO | 2015117253 A1 | 8/2015 |

OTHER PUBLICATIONS

International Search Report Form PCT/ISA/210, and Written Opinion Form PCT/ISA/237, International Application No. PCT/EP2019/067514 pp. 1-11 International Filing Date Jul. 1, 2019 search report dated Aug. 10, 2019.
Chinese First Office Action, dated Mar. 9, 2022. pp. 1-9.

* cited by examiner

CONNECTION ELEMENT AND METHOD FOR INTRODUCING A CONNECTION ELEMENT

CROSS-REFERENCE TO RELATED APPLICATION

The present application is the U.S. National Stage Application of International Application No. PCT/EP2019/067514 filed Jul. 1, 2019, which relates and claims priority to German Application No. 10 2018 117 370.9, filed Jul. 18, 2018, the entire contents of each of which are hereby incorporated by reference.

BACKGROUND

The invention relates to a connection element, in particular a thermal adhesive bonding boss, to be introduced into at least one component, in particular to be introduced into a hollow chamber component, in particular a plate-shaped hollow chamber component which has hollow chambers, under the effect of pressure and rotation, comprising a main part which comprises a thermoplastic synthetic material, wherein the connection element has a longitudinal axis and is designed to rotate about the longitudinal axis, wherein the connection element has an upper face with a tool placement point and a lower face which faces away from the upper face. The invention further relates to a method for introducing such a connection element into a hollow chamber component, in particular a plate-shaped hollow chamber component which has hollow chambers.

Comparable connection elements are known from the prior art. For example, DE 10 2014 204 449 A1 shows such a connection element. In addition, DE 10 2015 208 671 A1 also shows a connection element.

Such connection elements are used in particular in aircraft construction in order to introduce them into one or more hollow chamber components. In the case of simultaneous introduction into a plurality of hollow chamber components, a connection of the hollow chamber components to one another can be provided. During the introduction into a single hollow chamber component, functional elements arranged on the connection element can be attached to the hollow chamber component. For example, connection elements having a type of central passage are known which, when the connection element is introduced into the hollow chamber component, can be used to lead through cables or the like.

The hollow chamber components usually include a base layer, a cover layer and a honeycomb structure arranged between the base layer and cover layer. The base layer and the cover layer are advantageously made from glass fiber mats soaked in epoxy resin, the honeycomb structure being made from aramid fibers or paper soaked in phenolic resin.

When connection elements known from the prior art are introduced, it has been shown that their fastening in the hollow chamber components is in some cases insufficient, so that the connection elements have become detached from the hollow chamber components again. Especially in aircraft construction, however, a permanently secure fastening of connection elements is essential. On the other hand, due to the often large number of connections in aircraft construction, a cost-effective connection element is required.

SUMMARY OF THE INVENTION

The invention is therefore based on the object of providing a connection element to be introduced into hollow chamber components which can be permanently and securely fastened in hollow chamber components, wherein the connection element is able to be manufactured inexpensively.

This problem is solved by a connection element having the features of claim 1. A connection element of this type is characterized in that the connection element has an expanding portion made of a thermally activatable, expandable material on a circumferential surface on the main part that extends between the upper face and the lower face.

The connection element is advantageously designed to be essentially rotationally symmetrical and in the main part has a tool placement point for transmitting a torque in the region on the upper face. This makes it possible to apply an axial force in the direction of the longitudinal axis to the connection element to be introduced into a hollow chamber component and at the same time to drive it in rotation about the longitudinal axis.

During the introduction into a hollow chamber component, the thermally activatable, expandable material of the expanding portion can extend into hollow chambers in the honeycomb structure of the hollow chamber component due to heat generated by friction between the connection element and the hollow chamber component, so that an additional undercut can be created below the cover layer of the hollow chamber component by which the connection element can be securely fastened in the hollow chamber component.

A first advantageous further development of the connection element provides that in the main part a groove is provided in which the expanding portion is arranged. It has proven to be particularly preferred if the groove is circumferential. It is conceivable that the groove is a rectangular groove or has a semicircular cross section. Of course, any other groove cross section is conceivable that is easy to produce in terms of manufacturing technology. It has also proven to be advantageous if the surface of the expanding portion is flush with a circumferential surface of the main part in the delivery state. The groove is advantageously arranged in the direction of the longitudinal axis in the upper third or upper quarter, i.e. in the third or quarter oriented toward the upper face, so that the undercut which can be produced by the expandable material can be introduced in the region of a cover layer of a hollow chamber component.

According to a particularly preferred embodiment of the connection element, it is provided that the thermally activatable material is a thermoplastic synthetic material which comprises a blowing agent that can in particular be thermally activated. It is conceivable that the blowing agent sublimates when heated.

The thermally activatable, expandable material is advantageously designed to extend under the action of heat. The thermally activatable, expandable material can thus extend into hollow chambers of the hollow chamber component due to the frictional heat generated during the introduction into a hollow chamber component.

It is also advantageous if a metallic sleeve is provided which is arranged in the main part and concentrically to the longitudinal axis. The sleeve advantageously has a circular-cylindrical opening or bore, so that when the connection element is introduced into a component or hollow chamber component, cables can be passed through the opening or bore. The connection element advantageously has a length in the direction of the longitudinal axis which is selected such that a connection element introduced into a hollow chamber component penetrates the hollow chamber component completely. Because the connection element partially melts when the connection element is introduced into a hollow chamber component, it can be provided that the original length of the connection element is approximately 30% greater than the thickness of the hollow chamber component.

The metallic sleeve is advantageously made of aluminum or stainless steel.

Another particularly advantageous further development of the connection element is characterized in that the metallic sleeve has a plasma-treated surface and is at least partially encapsulated with the thermoplastic synthetic material of the main part. It is particularly preferred if the surface of the sleeve is plasma-nitrided. The adhesion of the thermoplastic synthetic material to the metallic sleeve can thus be improved. As an alternative or in addition to this, it is conceivable that the sleeve has a non-circular-cylindrical region which protects the sleeve in the thermoplastic synthetic material against twisting, for example a square or hexagonal head. However, it is also conceivable that a knurl, ribbing and/or grooving is provided on the surface of the sleeve. The introduction of ribs, grooves or a knurl, as well as the use of a square or hexagonal head, however, lead to overall comparatively large connection elements due to the necessary wall thicknesses of the sleeve and the dimensions of the square or hexagonal head. A plasma treatment of the surface has consequently proven to be particularly advantageous, because metallic sleeves having a comparatively thin wall thickness can be used.

The metallic sleeve is advantageously closed off by the main part in the region of the lower face, or the main part has an opening arranged concentrically to the longitudinal axis of the connection element in the region of the lower face. If the metallic sleeve is closed off by the main part in the region of the lower face, it has proven to be advantageous if the lower face of the main part is pierced by a tool, in particular by the tool driving the connection element during the introduction into a hollow chamber component, so that an opening is produced which penetrates the connection element along the longitudinal axis from the upper face to the lower face. Correspondingly, cables can be passed through the metallic sleeve of a connection element introduced into a hollow chamber component.

It is also advantageous if the thermoplastic synthetic material of the main part is polyamide or polypropylene. It is conceivable that the main part consists entirely of the thermoplastic synthetic material. However, it is also conceivable that the main part consists of thermoplastic synthetic material together with a corresponding proportion of glass fibers. The thermoplastic synthetic material is advantageously polyamide 6, polyamide 66 or polyamide 666.

According to another, particularly advantageous further development of the connection element, it is provided that the connection element has a radius in the range of from 1 mm to 2 mm at a transition region between the lower face and the circumferential surface. Such a radius has proven to be particularly advantageous for process engineering reasons.

The object mentioned at the outset is also achieved by a method having the features of claim 11 for introducing a connection element according to any of claims 1 to 10 into a hollow chamber component, in particular a plate-shaped hollow chamber component which has hollow chambers. The method is characterized by rotationally driving the connection element about its longitudinal axis and applying an axial force along the longitudinal axis of the connection element in the direction of the hollow chamber component by means of a tool, so that the thermally activatable expandable material extends due to heat generated by friction between the connection element and the hollow chamber component, in particular in hollow chambers of the hollow chamber component. A pre-punching of the hollow chamber component can thus be avoided.

A first advantageous further development of the method provides that the connection element is introduced into the hollow chamber component in such a way that it completely penetrates the hollow chamber component after being introduced in the direction of the longitudinal axis of the connection element.

It has proven to be particularly preferred if the connection element has a metallic sleeve which is arranged in the main part and concentrically to the longitudinal axis, wherein cables are passed through the sleeve after the introduction. Thus, cables can be passed through the hollow chamber component. If a connection element is used in which the metallic sleeve is closed off by the main part in the region of the lower face, it is advantageously provided that, when the connection element is introduced in the region of the lower face of the connection element, the main part is pierced by the tool in such a way that an opening is produced which penetrates the connection element along the longitudinal axis from the upper face to the lower face.

Furthermore, it is advantageous if the tool applies an axial force in the range of from approximately 800 N to approximately 1,200 N, preferably approximately 1,000 N, to the connecting means.

The connecting means is advantageously driven by the tool at a rotational speed in the range of from approximately 4,000 rpm to approximately 6,000 rpm, preferably approximately 5,000 rpm.

BRIEF DESCRIPTION OF THE DRAWINGS

Further details and advantageous further developments can be found in the following description, on the basis of which different embodiments of the invention are explained and described in more detail.

In the drawings.

DETAILED DESCRIPTION

Figure 3:
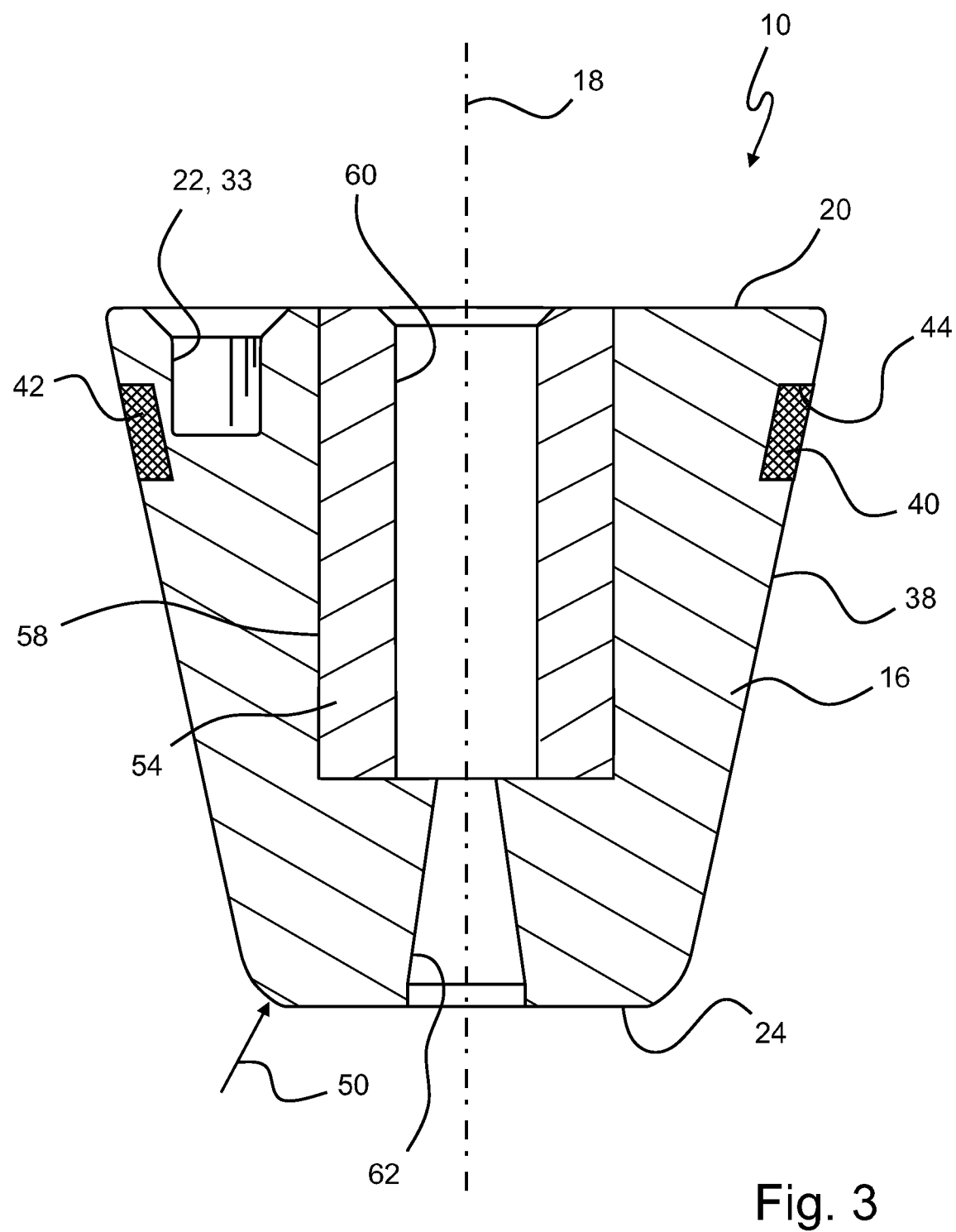
FIG. 3 is a section through a third embodiment of a connection element according to the invention along the line A-A according to FIG. 5.
Figure 4:
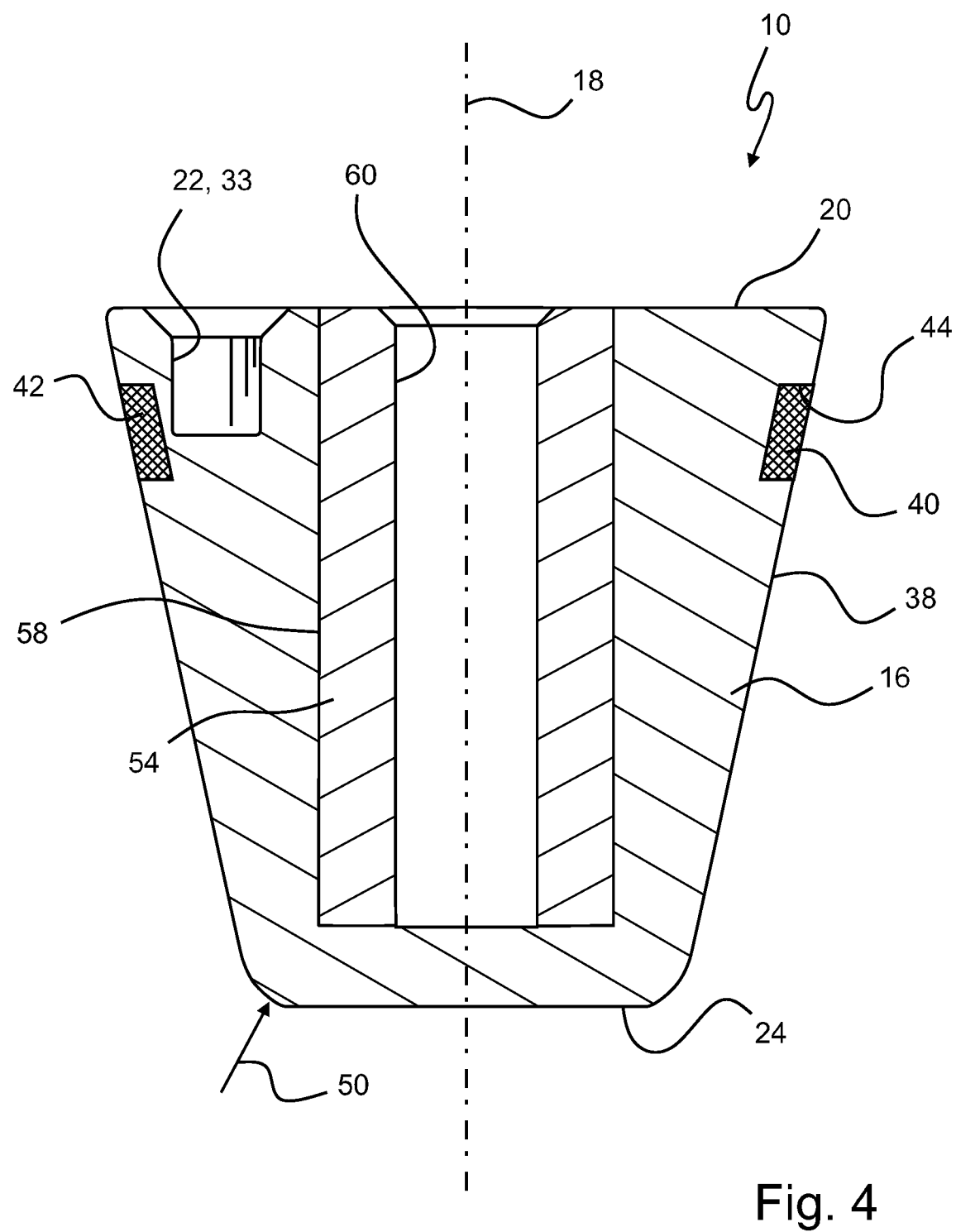
FIG. 4 is a section through a fourth embodiment of a connection element according to the invention along the line A-A according to FIG. 5.
Figure 5:
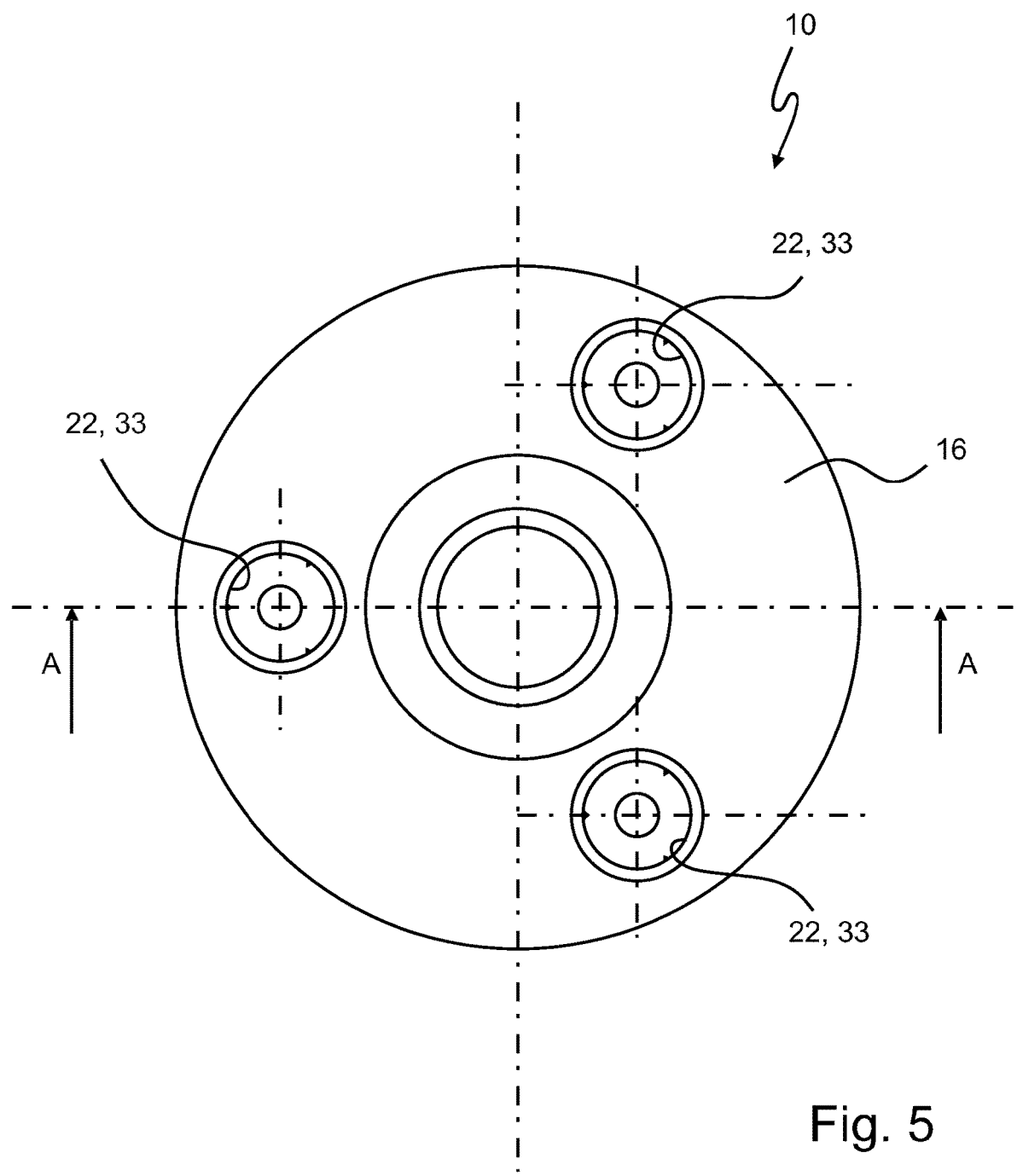
FIG. 5 is a top view of a connection element according to the invention as shown in FIGS. 1 to 4.

In FIGS. 1 to 4, various embodiments of a connection element 10 according to the invention are shown in section along the line A-A according to FIG. 5. Corresponding elements are identified by the corresponding reference symbols.

Figure 6:
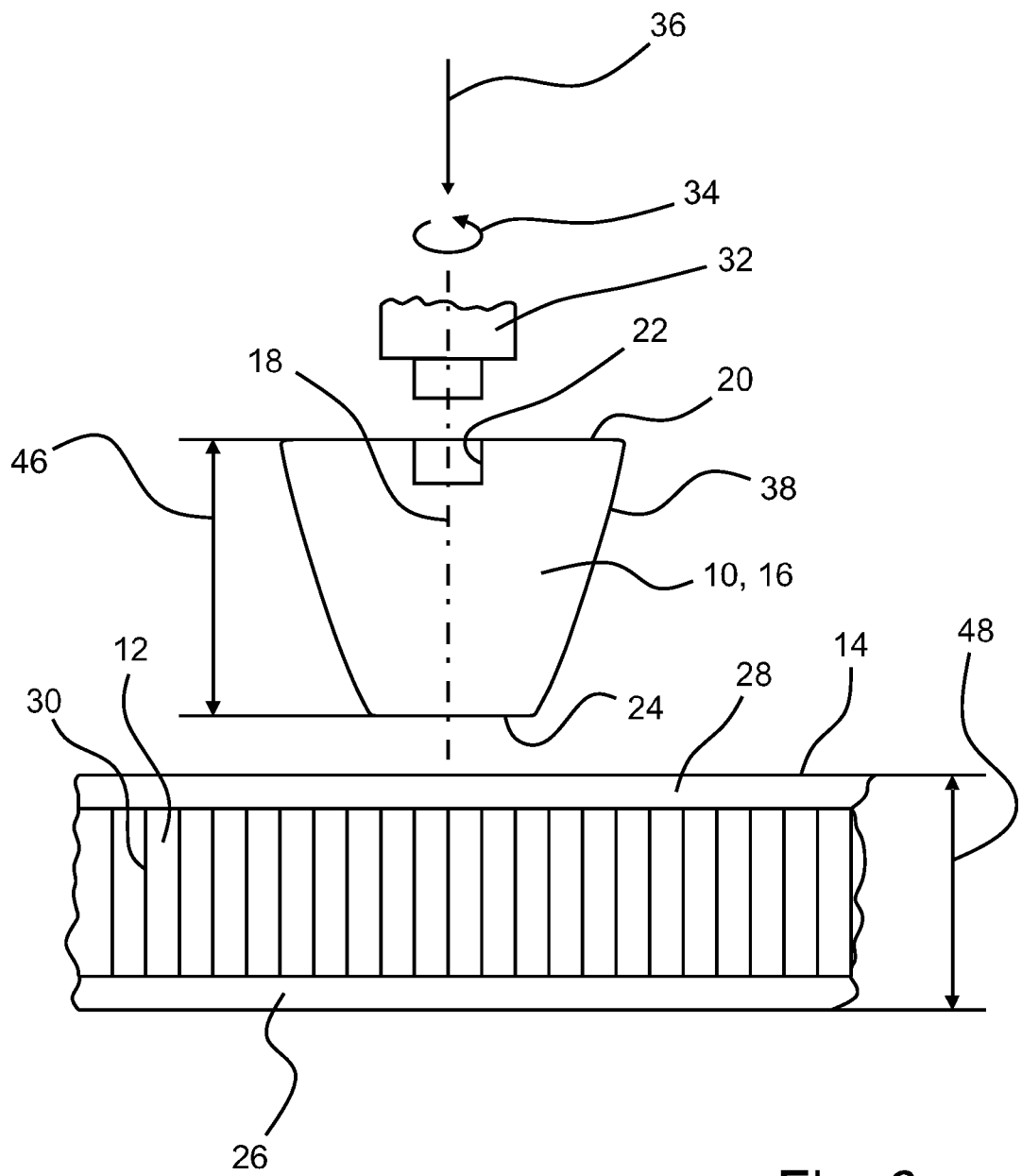
FIG. 6 is a schematic representation for the introduction of a connection element according to the prior art into a hollow chamber component.

Connection elements 10, shown schematically in FIG. 6 and also referred to as thermal adhesive bonding boss, are known in the art which are designed to be introduced into a plate-shaped hollow chamber component 14 which has hollow chambers 12 under the effect of pressure and rotation.

The connection elements 10 are designed to be essentially rotationally symmetrical and have a main part 16 which comprises a thermoplastic synthetic material. The connection elements 10 also have a longitudinal axis 18 and are designed for rotation about the longitudinal axis 18. The connection elements 10 have an upper face 20 with a tool placement point 22 for the transmission of torque, and a lower face 24 facing away from the upper face 20.

In particular in aircraft construction, such connection elements 10 are used in order to introduce them into one or more of the hollow chamber components 14 shown in FIG. 6. As can be clearly seen in FIG. 6, the hollow chamber components 14 usually include a base layer 26, a cover layer 28, and a honeycomb structure 30 arranged between the base layer 26 and cover layer 28. The base layer 26 and the cover layer 28 are advantageously made from glass fiber mats soaked in epoxy resin, the honeycomb structure 30 being made from aramid fibers or paper soaked in phenolic resin.

To introduce the connection element 10 into a hollow chamber component 14, it is rotationally driven in the direction of the arrow 34 by means of a tool 32 at the tool placement point 22 and subjected to an axial force acting along the longitudinal axis 18 in the direction of the hollow chamber component 14, i.e. in the direction of the arrow 36. The tool placement point 22 of the connection elements 10 shown in FIGS. 1 to 5 comprises, as can be clearly seen in FIG. 5, three eccentrically arranged blind holes 33.

When the connection elements 10 shown in FIG. 6 and known from the prior art are introduced, it has been shown that their fastening in the hollow chamber components 14 is to some extent insufficient, so that some of the connection elements 10 have detached from hollow chamber components 14.

The connection elements 10 according to the invention shown in FIGS. 1 to 5 therefore have an expanding portion 40 made of a thermally activatable, expandable material on a circumferential surface 38 on the main part 16 that extends between the upper face 20 and the lower face 24. For this purpose, a circumferential groove 42 is provided in the main part 16 in the region of the upper quarter facing the upper face 20, in which groove the expanding portion 40 is arranged, so that a surface 44 of the expanding portion 40 is flush with the circumferential surface 38 of the main part 16 in the delivery state.

The thermally activatable, expandable material is designed to extend under the action of heat. The thermally activatable material is a thermoplastic synthetic material which comprises a thermally activatable blowing agent. It is conceivable that the blowing agent sublimates when heated. The thermoplastic synthetic material of the main part 16 is polyamide (polyamide 6, polyamide 66 or polyamide 666) or polypropylene. It is conceivable that the main part 16 consists entirely of the thermoplastic synthetic material. However, it is also conceivable that the main part 16 consists of thermoplastic synthetic material together with a corresponding portion of glass fibers.

During the introduction into a hollow chamber component 14, the thermally activatable expandable material of the expanding portion 40 can extend into hollow chambers 12 of the honeycomb structure 30 of the hollow chamber component 14 due to heat generated by friction between the connection element 10 and the hollow chamber component 14, so that below the cover layer 28 of the hollow chamber component 14 an additional undercut can be produced by means of which the connection element 10 can be securely fastened in the hollow chamber component 14. During the introduction into the hollow chamber component 14, the tool 32 acts on the connecting means 10 with an axial force in the range of from approximately 800 N to approximately 1,200 N, preferably approximately 1,000 N, and is driven at a rotational speed in the range of from approximately 4,000 rpm to approximately 6,000 rpm, preferably at about 5,000 rpm.

The connection elements shown in FIGS. 1 to 5 have a length 46 in the direction of the longitudinal axis 18 (marked in FIG. 6 for reasons of clarity) which is selected such that a connection element 10 introduced into a hollow chamber component 14 completely penetrates the hollow chamber component 14. Because the connection element 10 partially melts when the connection element 10 is introduced into a hollow chamber component 14, the original length 46 of the connection element 10 is approximately 30% greater than a thickness 48 of the hollow chamber component 14.

For process engineering reasons, the connection elements shown in FIGS. 1 to 4 have a radius 50 in the range of from 1 mm to 2 mm at a transition region between the lower face 24 and the circumferential surface 38.

Figure 1:
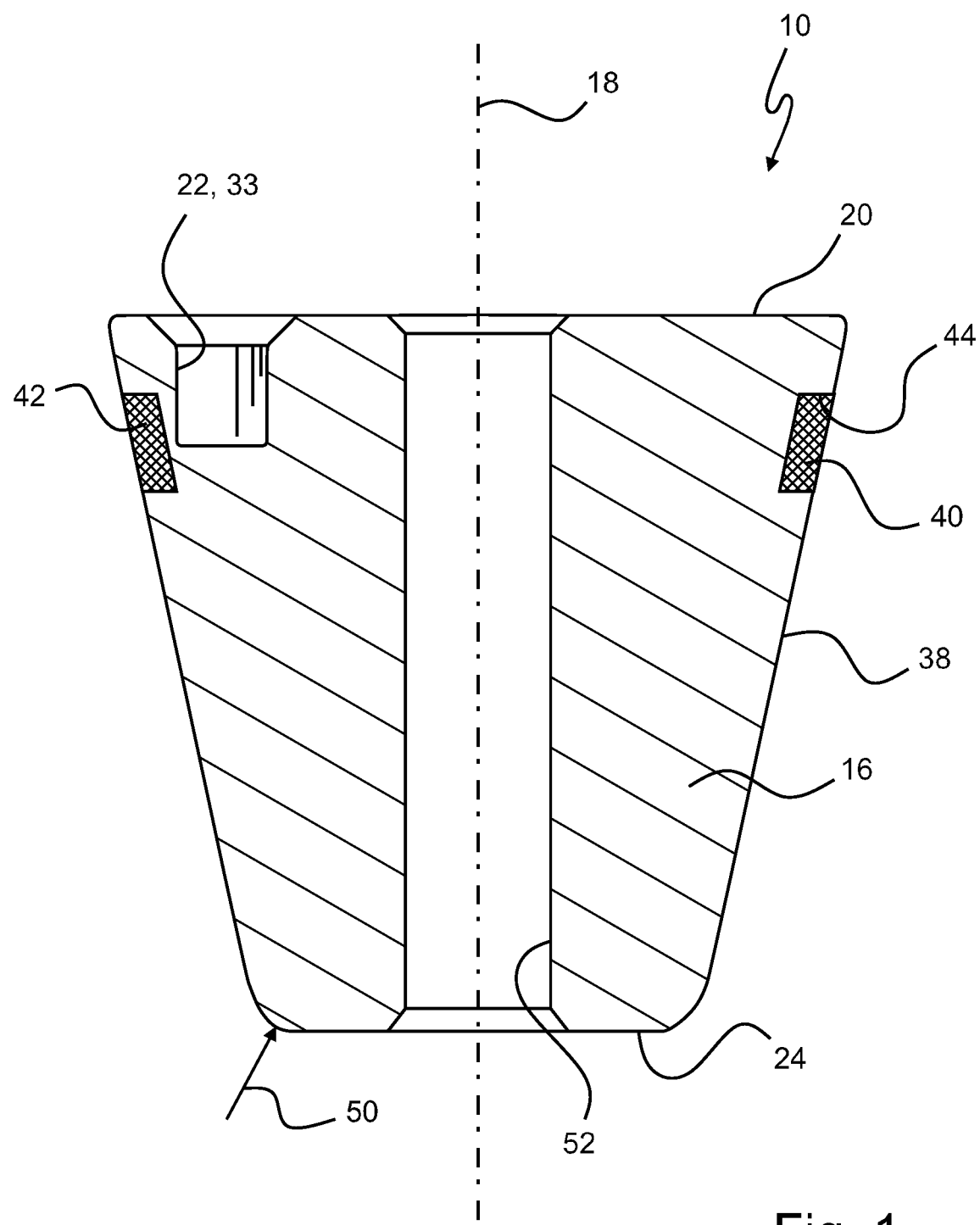
FIG. 1 is a section through a first embodiment of a connection element according to the invention along the line A-A according to FIG. 5.

The connection element 10 shown in FIG. 1 has in the main part 16 only one through hole 52 arranged concentrically to the longitudinal axis 18.

Figure 2:
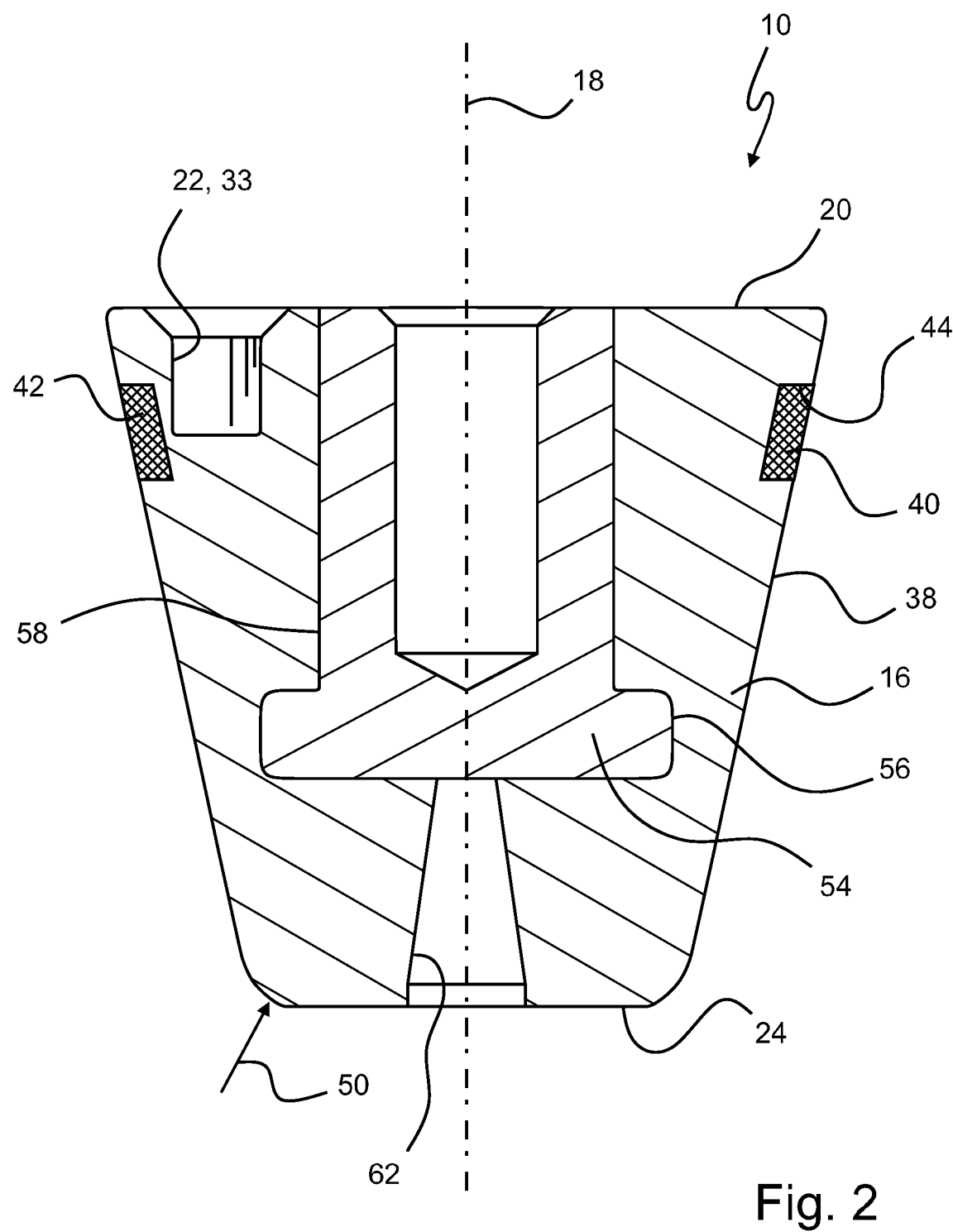
FIG. 2 is a section through a second embodiment of a connection element according to the invention along the line A-A according to FIG. 5.

The connection elements shown in FIGS. 2 to 4 have a metallic sleeve 54 which is arranged in the main part 16 concentrically to the longitudinal axis 18 and is at least partially encapsulated with the thermoplastic synthetic material of the main part 16. In the present case, the metallic sleeve 54 is made of aluminum. However, it is also conceivable that the metallic sleeve 54 is made of stainless steel.

To prevent rotation in relation to the thermoplastic synthetic material of the main part 16, the metallic sleeve 54 shown in FIG. 2 has a square or hexagonal head 56. However, it is also conceivable that a knurl, a ribbing and/or grooving is provided on the surface 58 of the sleeve 54.

The metallic sleeves 54 shown in FIGS. 3 and 4 have a surface 58 which has been plasma-treated by plasma-nitriding. Thus, the adhesion of the thermoplastic synthetic material to the metallic sleeve 54 can be improved. The metallic sleeves 54 of the connection elements shown in FIGS. 3 and 4 also have a circular-cylindrical opening or bore 60, so that when the connection element 10 is introduced into a hollow chamber component 14, cables can be passed through the opening or bore 60.

The main part 16 of the connection elements 10 shown in FIGS. 2 and 3 has an opening 62 arranged concentrically to the longitudinal axis 18 of the connection element 10. In the connection element 10 shown in FIG. 4, the metallic sleeve 54 is closed off by the main part 16 in the region of the lower face 24. If the metallic sleeve 54 is closed off by the main part 16 in the region of the lower face 24, the lower face 24 of the main part 16 must be pierced by the tool 32 driving the connection element 10 when it is introduced into a hollow chamber component 14, so that an opening is produced which penetrates the connection element 10 along the longitudinal axis 18 from the upper face 20 to the lower face 24. Correspondingly, cables can then be passed through a hollow chamber component 14 via the metallic sleeve 54.

Overall, an inexpensive option can be provided for permanently secure fastening of a connection element 10 in a hollow chamber component 14.

The invention claimed is:

1. A connection element to be introduced into at least one component under the effect of pressure and rotation, comprising a main part which comprises a thermoplastic synthetic material, the connection element having a longitudinal axis and being designed to rotate about the longitudinal axis, and the connection element having an upper face with a tool placement point and a lower face which faces away from the upper face, characterized in that the connection element has an expanding portion made of a thermally activatable expandable material on the main part on a circumferential surface extending between the upper face and the lower face; and wherein a groove in which the expanding portion is arranged is provided in the main part.

2. The connection element according to claim 1, wherein the thermally activatable material is a thermoplastic synthetic material which comprises a blowing agent.

3. The connection element according to claim 1, wherein the thermally activatable, expandable material is designed to extend under the action of heat.

4. The connection element according to claim 1, in which a metallic sleeve is provided which is arranged in the main part and concentrically to the longitudinal axis.

5. The connection element according to claim 4, wherein the metallic sleeve is made of aluminum or stainless steel.

6. The connection element according to claim 4, wherein the metallic sleeve has a plasma-treated surface and is at least partially encapsulated with the thermoplastic synthetic material of the main part.

7. The connection element according to claim 4, wherein the metallic sleeve is closed off by the main part in the region of the lower face or wherein the main part has an opening arranged concentrically to the longitudinal axis of the connection element in the region of the lower face.

8. The connection element according to claim 1, wherein the thermoplastic synthetic material of the main part is polyamide or polypropylene.

9. The connection element according to claim 1, wherein the connection element has a radius in the range of from 1 mm to 2 mm at a transition region between the lower face and the circumferential surface.

* * * * *